April 24, 1951 C. J. SMITH 2,549,942
VEHICLE SUSPENSION SYSTEM
Filed June 16, 1949

INVENTOR.
Charles J. Smith.
BY
Harness, Dickey & Pierce.
ATTORNEYS.

Patented Apr. 24, 1951

2,549,942

UNITED STATES PATENT OFFICE 2,549,942

VEHICLE SUSPENSION SYSTEM

Charles J. Smith, Monroe, Mich., assignor to Monroe Auto Equipment Company, Monroe, Mich., a corporation of Michigan Application June 16, 1949, Serial No. 99,536

4 Claims. (Cl. 267—8)

This invention relates to vehicle suspension systems and more particularly to a novel shock absorber mounting arrangement in a vehicle suspension.

It is conventional practice in automobile front end suspensions to connect a tubular, direct-acting, hydraulic shock absorber between the upper and lower control or suspension arms, outwardly of the point of pivotal connection of the arms to the vehicle frame. In such a construction the amount of shock absorber displacement or piston movement is relatively small, and, therefore, the most advantageous shock absorber control action is not obtained.

In the construction of this invention one end of the shock absorber is connected to the upper control arm inwardly of the point of connection of the latter to the vehicle frame, while the opposite end of the shock absorber is connected to the lower control arm intermediate its ends, so that greater shock absorber displacement or piston movement is obtained than with conventional arrangements, as described above. In this way the most advantageous shock absorber control action is obtained and a more efficient and satisfactory vehicle suspension system is provided.

It is, therefore, an object of this invention to provide a vehicle suspension system in which a tubular, direct-acting, hydraulic shock absorber is connected between the upper and lower suspension arms in such a manner as to obtain the maximum of shock absorber displacement or movement, and thereby increase the efficiency of shock absorber control and action, so as to provide a more efficient and satisfactory suspension system.

It is a further object of this invention to provide an efficient, economical and better vehicle suspension system than has been heretofore possible.

Figure 1:
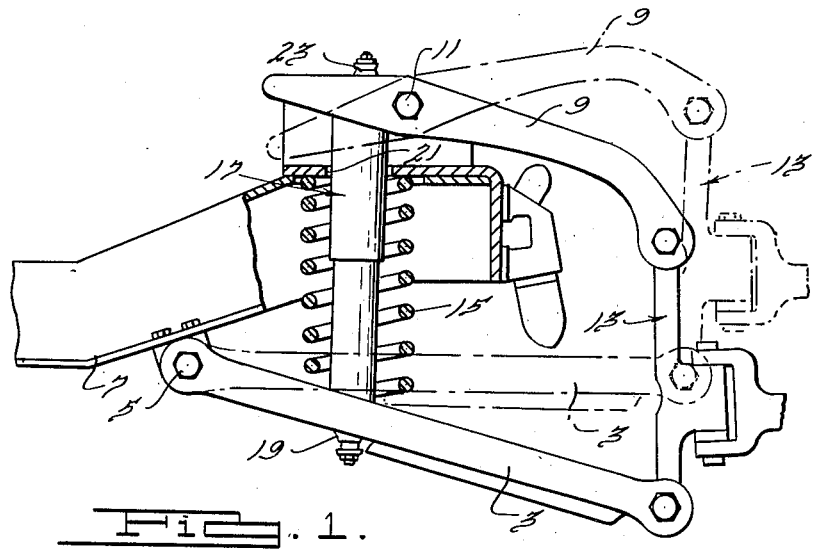
Figure 2:
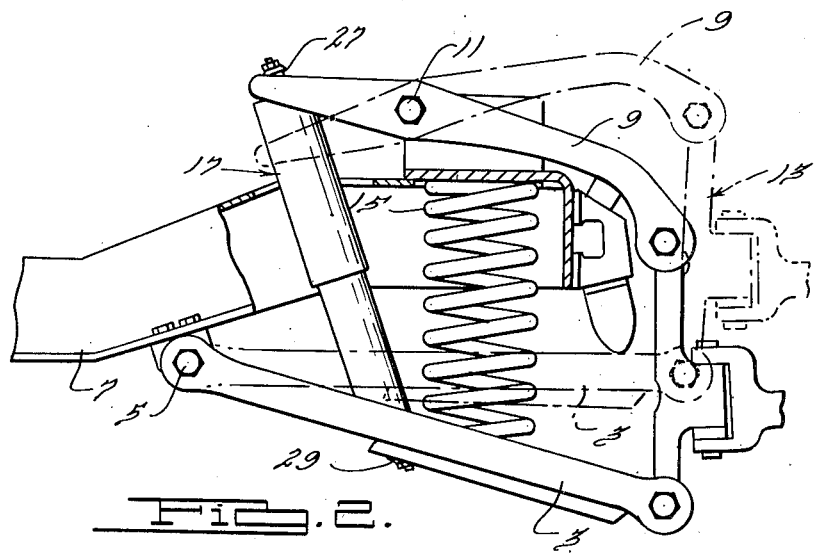

These and other objects of this invention will become apparent from the following detailed description taken in conjunction with the accompanying drawings, in which:

Figure 1 is a fragmentary front elevational view of a vehicle suspension, with parts broken away in section, and showing the suspension system in one position in solid lines and in a different possition in dot and dash lines; and Figure 2 is a view similar to Figure 1, of a further embodiment of the invention.

Referring now to the drawing, and more particularly to Figure 1, it will be seen that the vehicle suspension system includes a lower suspension or control arm 3, which is pivotally connected at its inner end at 5 to a transverse vehicle frame member 7, by any suitable means. The suspension arm 3 may be of the wishbone type or of any other conventional or suitable type. An upper control or suspension arm 9 is provided, which is pivotally connected, intermediate its ends, to the vehicle frame at 11. It will be noted that a portion of the upper control arm extends inwardly beyond the frame pivotal connection 11. The upper control arm likewise may be of any suitable or conventional type. The outer ends of the upper and lower control arms 9 and 3 respectively are pivotally interconnected by means of a suitable steering knuckle assembly 13, which in turn supports a vehicle ground-engaging wheel in any conventional manner. Extending between the vehicle frame member 7 and the lower control arm 3 is a coil suspension spring 15. A tubular, direct-acting, hydraulic shock absorber 17 extends longitudinally through the spring 15 and has its lower end connected to the lower control arm 3 at 19, in any suitable manner. The upper portion of the shock absorber 17 extends through an opening 21 in the frame member 7, and is connected to the upper control arm 9 at 23, in any suitable manner. It will be noted that the point of connection of the shock absorber to the upper control arm is inwardly of the point of connection 11 of the upper control arm 9 to the vehicle frame. The shock absorber 17 may be of any suitable type, such as that illustrated in Patent No. 2,360,755, issued October 17, 1944, to A. Boor for improvements in Shock Absorber, which is of the type comprising a pressure cylinder with a valved piston slidably disposed therein. The piston is, through a suitable piston rod and fittings, connected to the upper control arm at 23, and the pressure cylinder is, through suitable fittings and the like, connected to the lower control arm 3 at 19.

It can be appreciated that with shock absorbers of this type, the best shock absorber control and action is obtained when relative displacement between the shock absorber piston and pressure cylinder is relatively large. That is, the rebound of the spring 15 will be controlled in a more efficient and desirable manner by the shock absorber if the stroke of the piston in the pressure cylinder is of a substantial length. When the shock absorber is connected to both the upper and lower control arms, outwardly of their points of connection to the vehicle frame, as in conventional practise, maximum shock absorber control and action is not obtained, due to the relatively small shock absorber displacement. However, when the upper end of the shock absorber is connected to the upper control arm inwardly of the point of connection of the upper control arm to the frame, greater relative movement between the movable parts of the shock absorber will be obtained, thus effecting more efficient control in the vehicle suspension system. By extending the shock absorber 17 through the coil spring 15, the rebound action of the spring can be more easily controlled by the shock absorber than if it is disposed outside of the spring. Furthermore, this arrangement permits the spring to act as a protector for the shock absorber, thus making it desirable to locate the shock absorber inside the coil spring.

The embodiment illustrated in Fig. 2, is substantially the same as that illustrated in Fig. 1, and corresponding part numbers are applied for both Figures 1 and 2. However, in Fig. 2 the upper end of the shock absorber 17 is connected to the extreme inner end of the upper control arm 9 at 27, while the lower end is connected to the lower control arm 3 at 29, at a point outwardly disposed with respect to the point of connection 19 in the previous embodiment. The shock absorber 17 thus, in its normal position, is inclined both with respect to the horizontal and vertical, rather than being disposed in a substantially vertical position, as in Fig. 1. It will be appreciated that this arrangement permits even greater relative displacement between the piston and pressure cylinder of the shock absorber, so that very efficient shock absorber action is obtained. Furthermore, with this construction, the shock absorber is disposed at an angle more nearly normal to the upper control arm than in the previous embodiment. It will, however, be noted that in this embodiment the shock absorber 17 is disposed exteriorly of the coil suspension spring 15, and does not extend therethrough, as in the embodiment illustrated in Fig. 1.

It will, therefore, be appreciated that in the embodiments of this invention a novel and more efficient suspension system is provided, due to the fact that the shock absorber is connected with the suspension arms in a manner to provide relatively large shock absorber displacement, thus increasing the shock absorber control of the suspension spring and in general providing a more efficient and satisfactory vehicle suspension system.

What is claimed is:

1. A suspension system for a vehicle having a frame and a ground-engaging wheel, including vertically spaced suspension arms extending outwardly generally transversely of the longitudinal center line of the vehicle and adapted to have their outer ends connected to the ground-engaging wheel, suspension spring means connected between and engaging the suspension system and the vehicle frame, means connecting the upper suspension arm to the frame intermediate said arm ends for pivotal movement about an axis extending substantially longitudinally of the vehicle, means connecting the lower suspension arm to the frame for pivotal movement about an axis extending substantially longitudinally of the vehicle, and a tubular direct acting shock absorber connected to said lower suspension arm outwardly of its point of connection to the frame and to said upper suspensin arm inwardly of its point of connection to the frame.

2. A suspension system for a vehicle having a frame and a ground-engaging wheel, including vertically spaced suspension arms extending outwardly generally transversely of the longitudinal center line of the vehicle and adapted to have their outer ends connected to the ground-engaging wheel, suspension spring means extending between and having the opposite ends engaging the lower suspension arm and the vehicle frame, means connecting the upper suspension arm to said frame intermediate said arm ends for pivotal movement about an axis extending substantially longitudinally of the vehicle, means connecting the inner end of the lower suspension arm to said frame for pivotal movement about an axis extending substantially longitudinally of the vehicle, a tubular, direct-acting shock absorber extending between said upper and lower suspension arms, means connecting the upper end of said shock absorber to said upper suspension arm inwardly of the point of connection of said suspension arm to the vehicle frame, and means connecting the lower end of said shock absorber to said lower suspension arm outwardly of the point of connection of said lower suspension arm to the vehicle frame.

3. A suspension system for a vehicle having a frame and a ground-engaging wheel, including vertically spaced suspension arms extending outwardly generally transversely of the longitudinal center line of the vehicle and adapted to have their outer ends connected to the ground-engaging wheel, a coil spring extending between and engaging said lower suspension arm and a portion of the vehicle frame, means connecting the upper suspension arm to the frame intermediate the ends of said arm for pivotal movement about an axis extending substantially longitudinally of the vehicle, means connecting the lower suspension arm to the frame adjacent the inner end of said arm for pivotal movement about an axis extending substantially longitudinally of the vehicle, a tubular shock absorber extending longitudinally through said coil spring, means connecting one end of said shock absorber to said upper suspension arm inwardly of the point of connection of the latter to the vehicle frame, and means connecting the opposite end of said shock absorber to the lower suspension arm outwardly of its point of connection to the vehicle frame.

4. A suspension system for a vehicle having a frame and a ground-engaging wheel, including vertically spaced suspension arms extending outwardly generally transversely of the longitudinal center line of the vehicle and adapted to have their outer ends connected to the ground-engaging wheel, suspension spring means extending between and engaging one of said suspension arms and the vehicle frame, means connecting said upper suspension arm to the frame intermediate the ends of said arm for pivotal movement about an axis extending substantially longitudinally of the vehicle, means connecting said lower suspension arm to the vehicle frame adjacent the inner end of said arm for pivotal movement about an axis extending substantially longitudinally of the vehicle, shock absorber means for dampening the rebound action of said suspension spring means and including relatively movable portions, means connecting one of said shock absorber portions to said upper suspension arm inwardly of the point of connection of the latter to the vehicle frame and means connecting the other of said shock absorber portions to said lower suspension arm intermediate the ends of the latter.

CHARLES J. SMITH.

REFERENCES CITED

The following references are of record in the file of this patent:

UNITED STATES PATENTS

| Number | Name | Date |
| --- | --- | --- |
| 2,190,298 | Slack | Feb. 13, 1940 |
| 2,344,896 | Phelps | Mar. 21, 1944 |

FOREIGN PATENTS

| Number | Country | Date |
| --- | --- | --- |
| 475,625 | Great Britain | Nov. 23, 1937 |